(No Model.)

J. HELDER.
CHEESE MAKING APPARATUS.

No. 577,028.   Patented Feb. 16, 1897.

(No Model.) 2 Sheets—Sheet 2.
J. HELDER.
CHEESE MAKING APPARATUS.
No. 577,028. Patented Feb. 16, 1897.
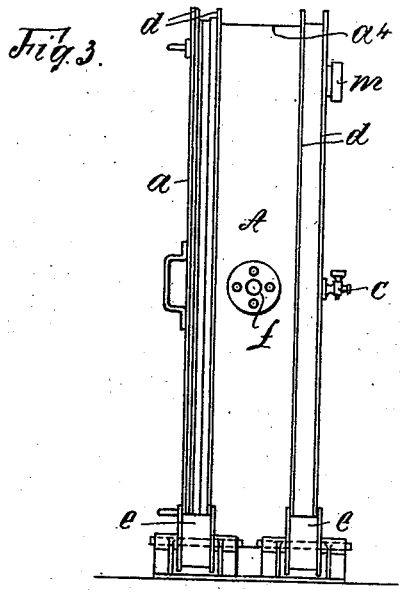
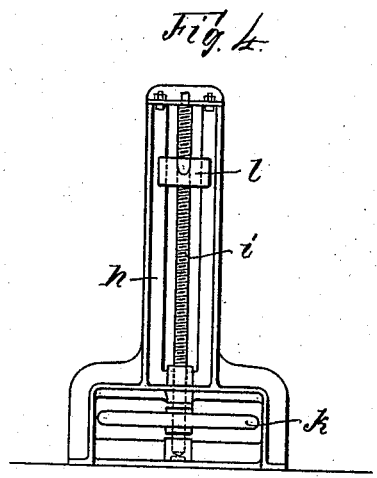
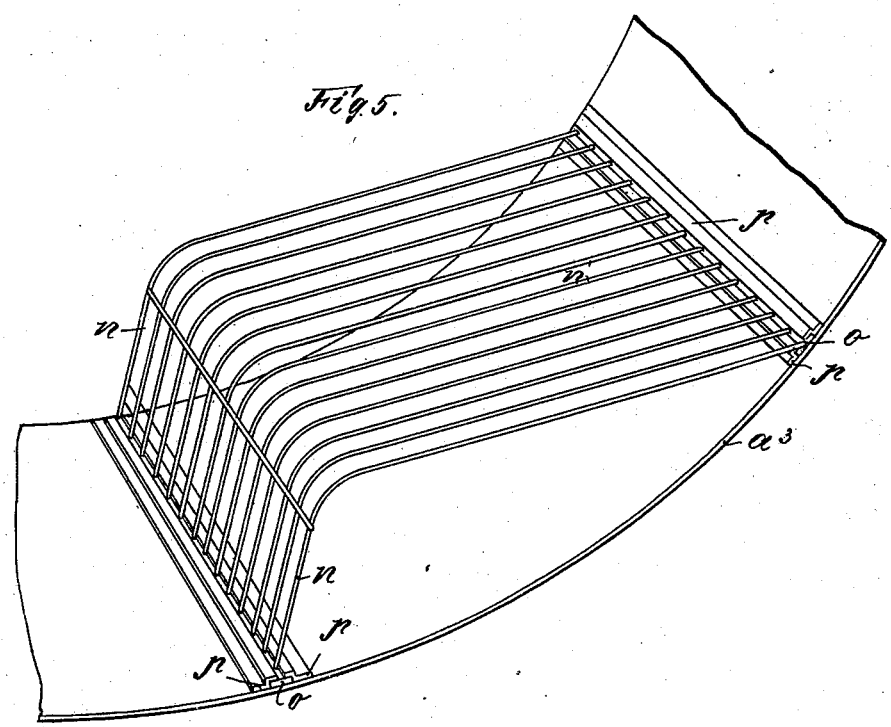
Witnesses.
Emil Kayser
Max Lochelt
Inventor:
Jan Helder
by
Hubert Deiple
Attorney.

UNITED STATES PATENT OFFICE.

JAN HELDER, OF DOKKUM, NETHERLANDS.

CHEESE-MAKING APPARATUS.

SPECIFICATION forming part of Letters Patent No. 577,028, dated February 16, 1897.

Application filed January 23, 1896. Serial No. 576,592. (No model.)

*To all whom it may concern:*

Be it known that I, JAN HELDER, barrister, a subject of the Queen of the Netherlands, and a resident of Dokkum, in the Netherlands, have invented an Improved Apparatus for Use in Making Cheese, of which the following is an exact specification.

It is a well-known fact that with many sorts of cheese the quality of the same depends greatly on the more or less perfect separation of the whey or watery part of the milk from the curd or coagulated part thereof, and it is further well known that to attain that result the mass resulting from the action of the rennet upon the milk should be reduced to pieces of the smallest size possible. To perform this in a mechanical or automatic way, a number of apparatus has already been constructed, but, as far as known to me, no one of them has up to now met with the desired success.

In view of the great advantages in industrial as well as in commercial respect that may be attained by an apparatus performing the separation and reduction above mentioned in a practically perfect manner I have constructed the apparatus shown in the accompanying drawings, in which similar letters denote similar parts throughout the different views, and in which—

Figure 1:
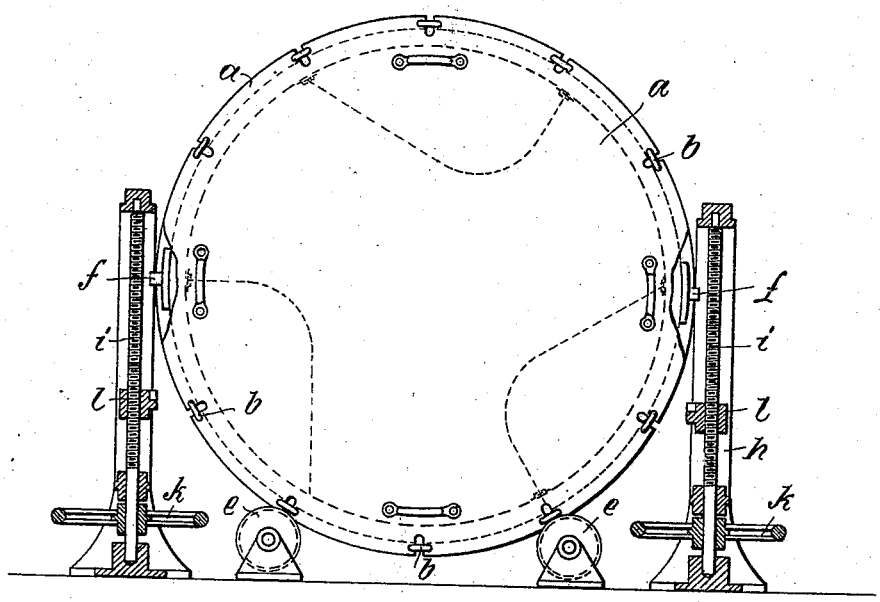
Figure 2:
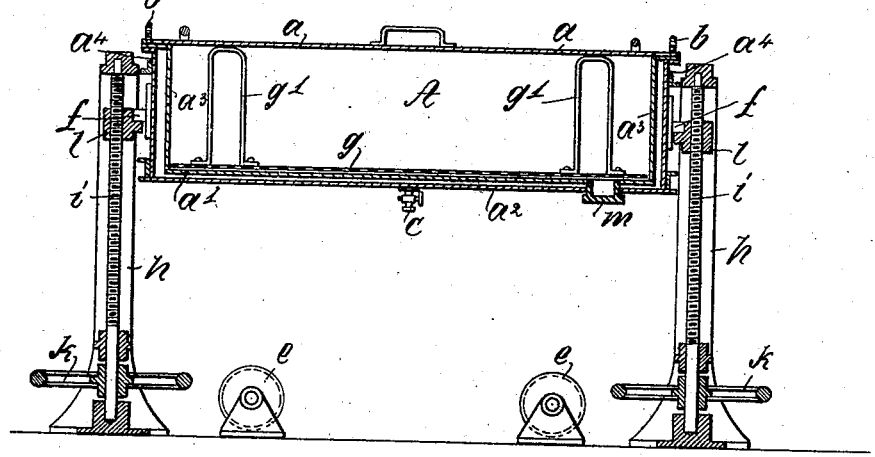

Figure 1 is a front view of said improved apparatus, showing the drum and the means for moving the same. Fig. 2 is a similar view, the drum being, however, turned for ninety degrees around a horizontal axis and shown in section. Fig. 3 is a side view of said drum, the right-hand standard of the apparatus being left away. Fig. 4 shows one of the standards; and Fig. 5 represents a portion of the mantle of the drum, together with a grate-like attachment consisting of wires or thin bars and forming part of my invention, this figure being drawn on a larger scale.

The apparatus consists, first of all, of the drum A, Figs. 2 and 3, which is provided with two bottoms $a'$ $a^2$, two concentric mantles $a^3$ $a^4$, and a cover $a$. The latter may be secured in position by screws $b$ or by any other suitable means. The bottom $a^2$ is furnished with a cock or valve $c$, through which steam, hot air, or the like may be admitted into the spaces between said two bottoms, as well as said concentric mantles. The purpose of said steam or the like is, as a matter of course, to heat and keep hot the mass contained within said drum.

The mantle $a^4$ of the drum is provided with two pairs of tracks $d$, running around said mantle and adapted to support the whole drum with its contents upon the rolls $e$, Fig. 1. The latter may be rotated by any suitable means, so as thereby to cause the drum to turn around a horizontal axis that may be thought to pass through the centers of the cover or lid $a$ and the bottoms $a'$ $a^2$. The mantle of the drum is further furnished with pivots $f$, Figs. 1 and 2, by means of which the drum may be supported independent of the rolls $e$, aforementioned. Said pivots come into use when the drum is to be turned into a horizontal position, Fig. 2. This position is the first employed in the process, and the drum is then provided with a loose sieve $g$, placed upon the bottom $a'$. Said sieve has handles $g'$, extending up into close proximity to the cover $a$.

In order to raise the drum from the rolls $e$ and to support it in its horizontal position, the apparatus possesses two standards $h$, Figs. 1, 2, and 4, having each a threaded vertical spindle $i$ and a hand-wheel $k$, fixed to said spindle. The latter support slides $l$, forming the bearings for the pivots $f$.

In using my improved apparatus I first raise the drum from the rolls $e$ by means of the parts $k$, $i$, and $l$, just mentioned, and I then turn the drum for ninety degrees, so as to bring it into horizontal position, and I fix it in this position by any suitable means. The screws $b$ are now loosened, the cover $a$ is removed, the sieve $g$ is put into the drum, and the latter is then filled with the milk to be turned into cheese. Said milk is first turned into curd and whey by adding rennet thereto, and the whey is then let off through the piece of tube $m$, Figs. 2 and 3. There remains, however, a large portion of the whey within or among the curd, and this portion is now to be removed. For this purpose I first cut the curd (which is a comparatively solid mass) into a large number of parallel prisms by drawing the sieve through it, which may be performed by any suitable means. The sieve proper consists of steel wire, is rather wide-meshed and strongly strained or stretched, so that the wires on being drawn upward through the mass cut the latter into a large number of prisms. The sieve thus removed is now replaced by some sets of curved knives n, Fig. 5. The latter are preferably formed also by steel wires, and I firmly connect the wires belonging to one set by plates o, adapted to take between guides p, secured to the inner side of the wall $a^3$. After said sets of knives n are secured in place the cover or lid a is screwed fast, so as to be tight, and the whole drum is then turned into vertical position and lowered down upon the rolls e. The slides or bearings l are lowered as far as to get free of the pivots f, and the drum is now caused to rotate by the mediation of said rolls e.

Owing to the weight of the mass contained within the drum the lower portions of the same are pressed by the upper portions into and among the knives or wires n of that set or sets which on its or their revolution passes or pass just through the lower half of its or their way. The prisms aforementioned are thus cut into pieces, and the rotation of the drum is continued until the pieces produced are so small that the mass represents a sort of pulp, without, however, being a pulp proper in the true sense of this word. The mass is now fit to be let off the drum (after having the latter again turned into horizontal position) and to be pressed in the usual way, so as to remove the whey freed by the cutting operation described. The curd remaining is then further treated in the usual way known to every one versed in the art in question, and I have therefore thought it unnecessary to describe the operations employed for turning the curd into eatable cheese, the more as said operations have nothing to do with the apparatus forming the subject-matter of my invention.

The main purpose of my invention is to produce a mass that is of perfectly uniform condition throughout its whole bulk.

Having thus fully described the nature of this invention, what I desire to secure by Letters Patent of the United States is—

1. In an apparatus for use in making cheese, the combination with a drum adapted to be tightly closed, and with means for rotating it around a horizontal axis, of means for turning said drum into a horizontal position whereby it may be rotated also around another horizontal axis forming angles of ninety degrees with said former axis, for the purpose as described.

2. In an apparatus for use in making cheese, the combination with a drum adapted to be tightly closed, and with rolls adapted to rotate said drum around a horizontal axis, of frames having means adapted to raise said drum from said rolls, to support it in its raised position, and to allow turning of the said drum around another horizontal axis forming angles of ninety degrees with said former axis, for the purpose as described.

3. In an apparatus for use in making cheese, the combination with a drum adapted to be tightly closed, and with rolls adapted to rotate said drum around a horizontal axis, of frames having vertical threaded spindles carrying slides forming bearings adapted to support said drum by means of pivots secured to the said drum; and means for turning said spindles, substantially as described.

4. In an apparatus for use in making cheese, the combination with a drum adapted to be turned into a horizontal position, and to be tightly closed, and with means for rotating said drum around a horizontal axis, of sets of knives adapted to be attached to and to be removed from the mantle of said drum; said sets consisting each of curved parallel wires connected by plates, and adapted to be arranged so as to extend in the circumference of said mantle; and means for detachably attaching said plates to the said mantle, substantially as described.

In testimony whereof I have signed this specification in the presence of two subscribing witnesses.

JAN HELDER.

Witnesses:
JAN BRUINWOLD RIEDEL,
AUGUST SIEGFRIED DOCER.